United States Patent [19]

Kroontje et al.

[11] 4,455,998
[45] Jun. 26, 1984

[54] SOLAR COLLECTOR

[75] Inventors: Wiggert Kroontje; Gijsbert Kuus, both of Eindhoven, Netherlands

[73] Assignee: U.S. Philips Corporation, New York, N.Y.

[21] Appl. No.: 321,298

[22] Filed: Nov. 13, 1981

[30] Foreign Application Priority Data

Dec. 4, 1980 [NL] Netherlands ............... 8006608

[51] Int. Cl.³ .................................. F24J 3/02
[52] U.S. Cl. ......................... 126/433; 126/443; 126/449; 165/96; 165/104.12; 165/DIG. 17
[58] Field of Search .......... 126/433, 443, 901, 449; 165/DIG. 17, 104.12, 96 HV; 252/181.1, 181.6, 188.28; 156/DIG. 66; 316/25

[56] References Cited

U.S. PATENT DOCUMENTS

| 3,167,159 | 1/1965 | Bovenkerk | 165/96 HV X |
| 3,823,305 | 7/1974 | Schroder | 165/96 HV X |
| 4,142,509 | 3/1979 | Hermann et al. | 126/433 X |
| 4,306,543 | 12/1981 | Doevenspeck et al. | 126/433 |
| 4,356,811 | 11/1982 | de Grijs et al. | 126/433 |

Primary Examiner—Daniel J. O'Connor
Assistant Examiner—Randall L. Green
Attorney, Agent, or Firm—Thomas A. Briody; William J. Streeter; Rolf E. Schneider

[57] ABSTRACT

There is provided a solar collector comprising an evacuated transparent envelope having an absorber arranged therewithin. A duct containing a heat-transport medium is arranged at least partially within such envelope and is so associated with the absorber that heat derived from incident solar radiation is transferred to the heat-transport medium in the duct during operation. A reversible heatable hydrogen getter consisting of a partial metal hydride is positioned in the envelope, together with a fully hydrogenized metal hydride thermally more stable and having a higher affinity for oxygen than the partial hydride.

2 Claims, 1 Drawing Figure

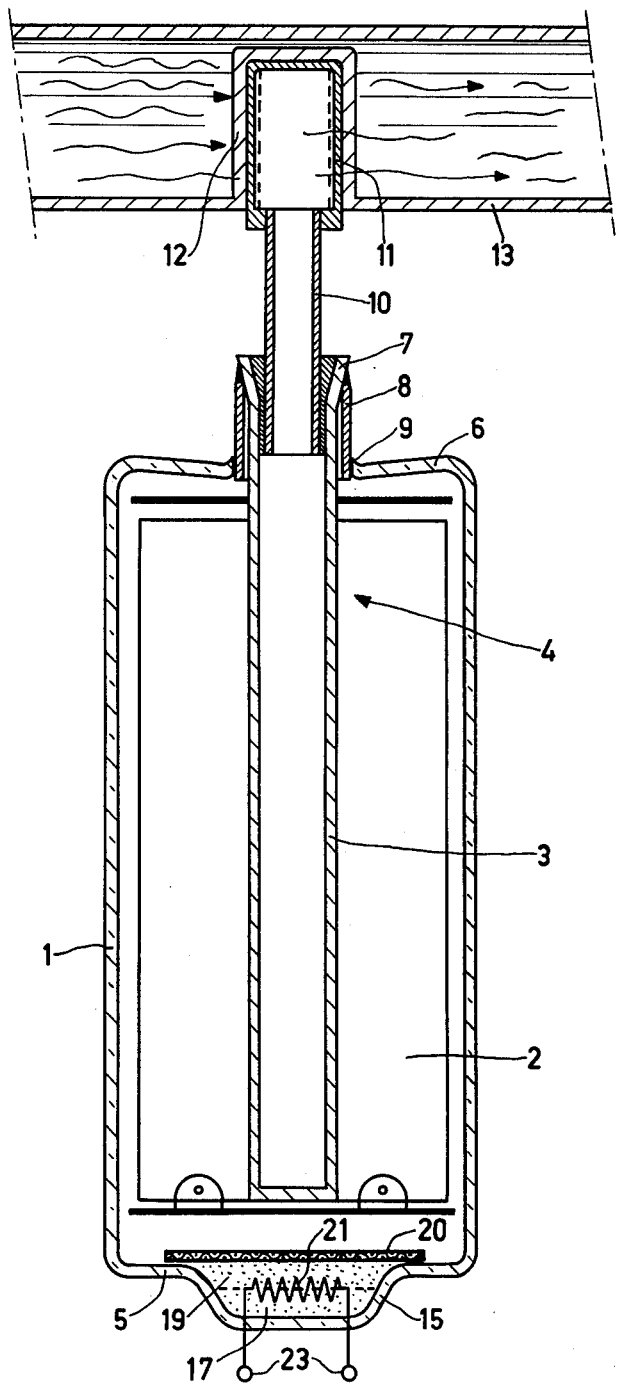

SOLAR COLLECTOR

This invention relates to a solar collector comprising an absorber for transferring heat derived from solar radiation incident on the absorber during operation to a heat-transport medium in a duct which exchanges heat with the absorber, and a cover which thermally insulates the absorber from the surroundings and which consists of at least one sealed and evacuated transparent tube or envelope containing a heatable, reversible hydrogen getter consisting of one or more of the metals titanium, zirconium, hafnium, scandium, yttrium, lanthanum, the rare earths, strontium, barium, vanadium, niobium, tantalum, thorium and alloys thereof in a partly hydrogenized condition.

A solor collector of the kind set forth is described in U.S. Pat. No. 4,142,509.

The reversible heatable hydrogen getter serves to control one of the loss factors of the solar collector, namely, the thermal conduction losses thereof, by controlling the hydrogen pressure in the evacuated envelope. Thus, if the heat collected by the absorber cannot be given up, for example, due to an interruption of the power supply of the water pump or if, for example, the heat production of the solar collector exceeds the storage capacity of the remainder of the installation during the summer, so that the temerature of the absorber tends to become too high, the losses of the solar collector can be increased by increasing the hydrogen pressure, thus counteracting a further temperature rise. The hydrogen pressure is increased by heating (electrically or by means of the solar heat) the reversible hydrogen getter which then releases hydrogen, whilst hydrogen is taken up again when the reversible hydrogen getter cools down, so that the solar collector maintains its normal high efficiency. Hydrogen is extremely suitable for this purpose because of its high thermal conductivity.

In the known solar collector, said metals, metal mixtures or metal alloys in a partly hydrogenized (non-stoichiometric) condition are used as reversible hydrogen getters.

It has been found that the rate at which the hydrogen is absorbed by said hydrogen getters is highly dependent on the treatment of the mixtures or alloys during the manufacturing process of the solar collector and on the residual gas discharge of the solar collector during its life. The cause of this is the surface oxidation of the alloy or the mixture, after which there is hardly any further reaction with hydrogen.

The present invention has for its object to provide a solar collector in which the reversible heatable hydrogen getter maintains very well its hydrogen absorbing and desorbing properties even after a prolonged life.

In order to realize this object, the solar collector in accordance with the invention is characterized in that in addition to the partly hydrogenized metal or metal mixture or metal alloy (partial hydride), there is also present in the tube a fully hydrogenized metal, said metal hydride being thermally more stable and having a higher oxygen affinity than the partly hydrogenized metal or mixture or alloy.

The oxygen released during the life of the solar collector will now react with the fully hydrogenized (stoichio-metric) metal hydride. The hydrogen then released is bound by the partly (non-stoichiometric) hydrogenized combination. The pressure control combination thus remains free of oxidation, so that its ability to bind and give off hydrogen is maintained for a very long period of time.

A preferred embodiment of the solar collector in accordance with the invention is characterized in that the reversible hydrogen getter is formed by a partly hydrogenized alloy of niobium and titanium, the fully hydrogenized metal being zirconium.

It has been found that a partly hydrogenized alloy of niobium and titanium has a reversible hydrogen pressure within very narrow limits in the temperature range from 25° C. to 300° C. which is very important for solar collectors. A further very important characteristic of this partly hydrogenized alloy consists in that the equilibrium pressure hardly changes over a wide range of compositions; in other words, these alloys have a so-called plateau which offers the advantage that the dosing of the hydrogen in the solar collector is substantially simplified.

Surface oxidation of the reversible hydrogen getter is then prevented by introducing a quantity of zirconium hydride in stoichiometric combination into the collector.

It has been found that the combination of a partly hydrogenized niobium-titanium alloy and a fully hydrogenized zirconium hydride results in a getter whereby the hydrogen pressure can be very accurately and quickly controlled during the entire life of the solar collector.

The invention will now be described in connection with the accompanying drawing, the sole FIGURE of which shows a sectional view of an embodiment of a solar collector in accordance with the invention.

The solar collector shown comprises a cover in the form of an envelope consisting of a glass tube 1. Such tube has a round cross-section and encloses a plate-shaped absorber 2 which is thermally conductively connected to the evaporator section 3 of a heat pipe 4. One end of the glass tube 1 is closed by a wall 5, the other end of the tube comprising an end wall 6 through which the heat pipe 4 passes. A subatomspheric pressure prevails in the tube 1. The passage of the heat pipe through the end wall 6 is constructed as follows. The end 7 of the evaporator section is slightly widened. A metal bush 8 is soldered to the outer circumference of the widened portion and is fused to the glass of the end wall 6 at the area 9.

In the widened portion 7 there is soldered a tube 10 which is connected to the condenser section 11 of the heat pipe 4, which section has a slightly larger diameter and whose inner surface may be provided with means such as a layer of gauze to increase the transfer of heat. The condenser section 11 is accommodated in a cavity 12 of a further heat-transporting system 13.

The evacuated envelope 1 includes a gas-permeable reservoir 15 which is filled partly with a first material mass 17 and partly with a second material mass 19. The reservoir 15 is covered by a gauze 20.

The first material mass 17 is formed by a partly hydrogenized alloy of niobium and titanium.

The second material mass 19 consists of fully hydrogenized zirconium hydride.

The reservoir also contains an electrical heating element 21 whose connections 23 pass through the wall 5.

In critical circumstances, viz., in the event of inadmissibly high temperatures of the absorber, the material masses 17 and 19 can be heated to a high temperature of, for example, 200° C. by application of a voltage to the connections 23 of the heating element 21. The niobium-titanium alloy mass 17 then gives off hydrogen, so that the tube is filled with hydrogen at a pressure of some pascals. Consequently, the loss factor of the solar collector increases so that due to these losses the solar collector temperature will not rise further.

When the voltage is switched off the mass 17 cools and the niobium-titanium alloy takes up hydrogen again by absorption until the sub-atmospheric pressure of less than $10^{-2}$ pascal has been restored in the tube.

Even though in principle mixtures and alloys of other metals are also suitable for this purpose, it has been found that hydrides of alloys of niobium and titanium have a hydrogen equilibrium pressure which changes only little over a larger range of compositions, whilst the reversible hydrogen pressure is also within narrow limits for a given temperature range.

The fully hydrogenized zirconium, being thermally more stable than the niobium-titanium hydride, does not participate in the hydrogen pressure control but has such a high oxygen affinity that any oxygen residues or any oxygen released by the solar collector components during operation is instantly gettered by the zirconium. The hydrogen then released is bound by the niobium-titanium alloy.

Even though an electrical heating means is used for heating the material masses in the described embodiment, it is alternatively possible to effect the heating in a different way, for example, by means of the sun itself or by bringing the material masses in thermally conductive contact with the absorber itself so that the absorber temperature is used directly as a control signal for the pressure in the absorber envelope. This result can easily be achieved by connecting the getter-container directly with the absorber so that the temperature of the absorber and the getter are always the same.

The use of a partly hydrogenized metal alloy for control of the hydrogen pressure in combination with a thermally more stable oxygen-gettering fully hydrogenized metal is not limited to the ideally suitable combination of a partial NbTiH and $ZrH_2$ mentioned in the example. Other fully hydrogenized hydrides are also feasible, for example, $YH_2$, $LaH_2$ or $ScH_2$. The use of said material combinations has been described with reference to one type of solar collector. It will be clear that the invention can be used for any type of solar collector where the absorber is insulated from the surroundings by a vacuum.

What is claimed is:

1. A solar collector which comprises an evacuated transparent envelope; an absorber arranged within said envelope; a duct arranged at least partially within said envelope and containing a heat-transport medium, said absorber being associated with said duct so as to transfer heat derived from incident solar radiation to the heat-transport medium in said duct during operation; a reversible heatable hydrogen getter positioned in said envelope and consisting of a partial hydride of one or more of titanium, zirconium, hafnium, scandium, yttrium, lanthanum, the rare earths, strontium, barium, vanadium, niobium, tantalum, thorium, and alloys of said metals; and a fully hydrogenized metal hydride also positioned in said envelope and being thermally more stable and having a higher affinity for oxygen than said partial hydride.

2. A solar collector according to claim 1, in which the reversible heatable hydrogen getter is a partial hydride of an alloy of niobium and titanium, and the fully hydrogenized metal hydride is zirconium hydride.

* * * * *